June 20, 1933.  C. A. PERSONS ET AL  1,914,977

SPLASH GUARD FOR VEHICLE FENDERS

Filed Feb. 28, 1930

Inventors:
Charles A. Persons
Nicholas B. Testa
By Owen W. Kennedy
Attorney

Patented June 20, 1933

1,914,977

UNITED STATES PATENT OFFICE

CHARLES A. PERSONS AND NICHOLAS B. TESTA, OF WORCESTER, MASSACHUSETTS, ASSIGNORS TO PERSONS-MAJESTIC MANUFACTURING COMPANY, OF WORCESTER, MASSACHUSETTS, A CORPORATION OF MASSACHUSETTS

SPLASH GUARD FOR VEHICLE FENDERS

Application filed February 28, 1930. Serial No. 432,223.

The present invention relates to a guard or shield that is adapted to be attached to the rear fenders of motor vehicles so as to protect the rear portion of the vehicle from material thrown up by the rear wheels of the vehicle when in motion.

It is well known that motor vehicles get far dirtier at the rear end than at the front, due to the fact that the rear wheels constantly throw upwardly towards the rear of the car material from the surface of the road such as dust, gravel, mud, oil and tar. The greater the speed of the vehicle, the greater is the amount of material thrown into the air by the rear wheels due to the vacuum effect produced by the passage of the vehicle itself, and this same vacuum effect has a tendency to draw onto the rear portions of the body of the vehicle a considerable amount of the material thrown into the air by the wheels. When liquid or semi-liquid material such as tar or oiled gravel is thrown up by the rear wheels, it will quickly cover the bumpers, spare tire and other fittings and will eventually ruin the finish of the rear of the body. The object of the present invention is to provide an improved splash guard or shield which will effectively prevent the accumulation of this foreign matter on the rear of the vehicle body.

While we are aware of the fact that splash guards for fenders are already in use to a limited extent, the guard embodying the present invention is far superior to previous guards inasmuch as it meets all service requirements, and can be readily installed on the fenders of a motor vehicle. Our improved guard possesses enough flexibility so that it will not be damaged by striking fixed objects, but at the same time possesses sufficient weight and stiffness to always tend to assume a vertical position in which it is most effective to deflect the stream of material thrown up by the rear wheels entirely away from the rear portion of the body. The above and other advantageous features of the invention will hereinafter more fully appear in the following description, with reference to the accompanying drawing, in which,—

Like reference characters refer to like parts throughout the different figures.

Figure 1:
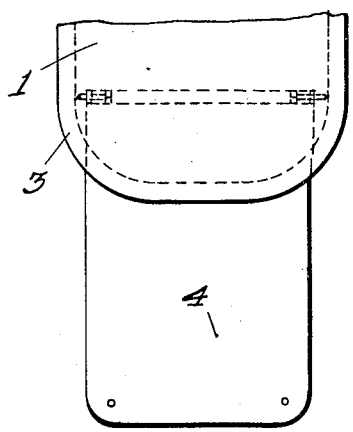
Fig. 1 is a view in front elevation of a splash guard attached to the rear fender of a vehicle, only a portion of the fender being shown.
Figure 2:
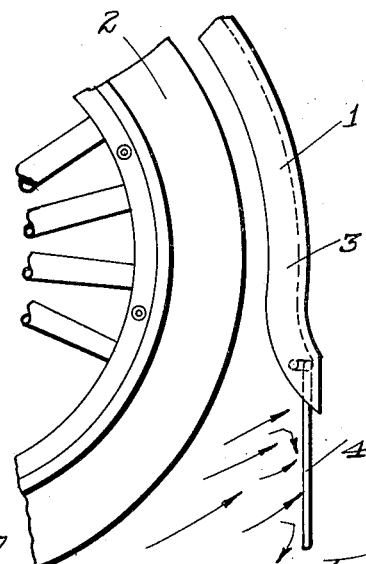
Fig. 2 is a view in side elevation of the parts shown in Fig. 1, and also showing the relation of the guard to a portion of the rear wheel of the vehicle.

Referring first to Figs. 1 and 2, a portion of the rear fender 1 of a motor vehicle is shown with relation to a portion of the rear wheel 2 which the fender 1 partially encircles. As is usual, the fender 1 provides around its perimeter an inwardly extending flange 3 and use is made of this flange 3 to support an improved splash guard embodying our invention, the guard being generally designated by the reference character 4. The guard 4 is pivotally mounted at the lower end of the fender 1, in a manner hereinafter described, so that it is free to swing and always tends to assume a nearly vertical position, as shown in Fig. 2. Thus the inner face of the guard 4 deflects away from the rear end of the vehicle, practically all of the material kicked up from the road surface by the rotation of the wheel 2, as indicated by the arrows.

Figures 3, 4:
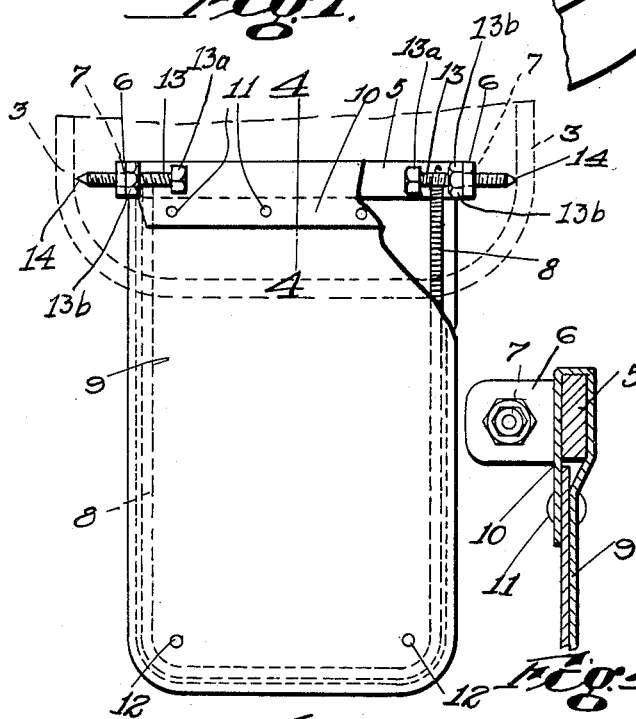
Fig. 3 is a detailed view of the guard shown in Fig. 1, on an enlarged scale, showing the manner in which it is attached to the fender.
Fig. 4 is a sectional view along the line 4—4 of Fig. 3.

As best shown in Figs. 3 and 4, the guard 4 consists of a metallic frame member 5 preferably in the form of a bar bent at its ends to provide ears 6, each providing a threaded opening 7. The frame or bar 5 also serves as a support for a flexible member 8 bent in the form of a loop with its ends secured to the bar 5 adjacent the ears 6 in any suitable manner, as by riveting or welding. The flexible member 8 may be made of coiled wire, or any other suitable material heavy enough to serve as a reinforcement for the outer edge of a cover 9 which encloses both the bar 5 and the flexible member 8, on both sides.

Preferably the cover 9 is made of heavy canvas suitably water proofed and impregnated with a material to give it a finished appearance, the cover 9 being made in the general form of an envelope of such dimensions that when the flexible member 8 is placed therein, it will serve as an edge reinforcement for the parallel sides and bottom of the cover 9 as indicated in dotted lines. The top of the cover 9 is supported by the bar 5 and, preferably, a flap 10 is provided folded around the bar 5 and secured permanently in position by rivets 11. In addition, rivets 12 are provided at the lower corners of the cover 9 so as to confine the flexible member 8 between the rounded corners of the cover and the rivets 12. Consequently, the cover 9 with the inclosed supporting bar 5 and reinforcing member 8 constitute a substantially unitary structure which can be conveniently attached to the rear fender of a vehicle in a manner which will be next described.

As previously pointed out, the cross bar 5 provides ears 6 with threaded openings 7 in each of which is received a threaded stud 13 providing a pointed end 14. When it is desired to attach the guard 4 to the fender 1, the studs 13 are turned to bring their heads 13a well within the ears 6 after which the upper portion of the guard is inserted between the opposed flanges 3 near the lower end of the fender 1. The studs 13 are then turned in to cause their points 14 to engage the opposed faces of the fender flange 3, the studs 13 being turned sufficiently to cause the points 14 to bite into the metal of the fender flange 3, after which the studs are secured by lock nuts 13b.

When once a guard 4 has been secured to the fender 1 in the manner described above, it is obvious that it will be practically impossible to remove it without the use of a tool, and furthermore that the studs 13 with their pointed ends 14 received in the fender flange 3, serve as pivots about which the guard 4 will swing freely. As a consequence, the guard will always tend to assume a vertical position as shown in Fig. 2, although it will swing rearwardly somewhat when it is subjected to a stream of relatively heavy material thrown against the guard of the action of the rear wheel 2. But even when the guard 4 is swung back by the force of the material, its relatively heavy weight causes the guard 4 to deflect the material downwardly. In other words, the guard has enough weight so that it will not flap back in the wind as would a guard composed merely of a light fabric without reinforcement.

Figure 5:
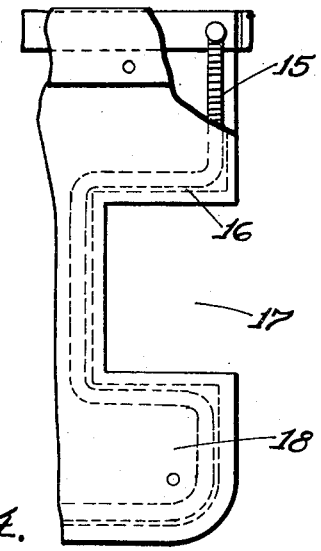
Fig. 5 illustrates a modification of the guard shown in Fig. 3.

In Fig. 5 there is shown a modification in the general form of the guard in order to meet a condition in which a rear spring of the vehicle projects into the space immediately below the end of the rear fender. In this modified form, the flexible reinforcing member 15 is bent inwardly and back again at 16 so as to provide an open space 17 at one side of the guard. The cover 18 of this modified type of guard is cut away at one side to conform to the contour of the reinforcing member 15, so that the finished guard provides an open space 17 for the free action of the spring, or any other portion of the vehicle which may project into the space below the lower portion of a rear fender. Otherwise, the construction of the guard shown in Fig. 5 is identical with the guard shown in Fig. 3.

Figure 6:
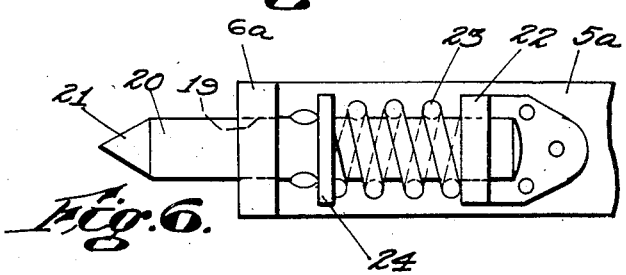
Fig. 6 is a fragmentary view showing on an enlarged scale a modification in the manner of attaching the guard to a fender.

In Fig. 6 there is shown a modification in the manner of attaching a guard to the flange of the fender in order to permit its installation without the use of a tool for turning the studs 13 as described above. In this modification, the top bar 5a of the guard provides ears 6a with openings 19 for loosely receiving pins 20 each providing a point 21 beyond the ear 6a. The opposite end of each pin 20 is loosely received in a lug 22 suitably secured to the bar 5a and that portion of the pin 20 between the lug 22 and the ear 6a is partially surrounded by a spring 23. One end of this spring 23 bears against the stationary lug 22 while the other end thereof bears on a collar 24 made fast on the pin 20 in any suitable manner, as by pinching out the metal of the pin 20 beyond the collar 24 to prevent movement of the collar 24 on the pin.

When it is desired to attach the modified form of guard, shown in Fig. 6, to the fender, the pins 20 projecting from opposite sides of the guard are withdrawn by pressing on the collars 24 so as to permit the insertion of the ends of the pins 20 between the flange 3 of the fender. Then when the collars 24 are released the springs 23 exert pressure in opposite directions to force the pointed ends 24 of the pins 20 into opposed faces of the fender flange 3, thereby holding the guard firmly in position, although permitting its free swinging movement about the pins 20.

From the foregoing, it is apparent then that by our invention we have provided an extremely effective splash guard for the fenders of motor vehicles that may be quickly and firmly attached to the fender of a vehicle with a considerable range of adjustment to permit attachment of the guards to fenders of different widths. The guard is so constructed and mounted that it will readily yield when striking a solid object, but at the same time possesses sufficient stiffness and weight to always function effectively to prevent material thrown up by the rear wheels of the vehicle from coming into contact with the rear portion of the vehicle body. Although the main portion of the guard is constructed of fabric, the reinforcing member around its edges always holds it in shape so that it will present a pleasing appearance on the vehicle.

We claim:

A splash guard assembly for attachment to the fender of a vehicle comprising a relatively stiff frame member, an envelope of flexible material carried by the frame member and a flexible reinforcing member extending around the edge of said envelope within the same and secured at its ends to said frame member.

CHARLES A. PERSONS.
NICHOLAS B. TESTA.